United States Patent
Mate et al.

(10) Patent No.: US 11,794,198 B2
(45) Date of Patent: *Oct. 24, 2023

(54) NOZZLE

(71) Applicant: DEERE & COMPANY, Moline, IL (US)

(72) Inventors: Mahesh S. Mate, Pune (IN); Shrikant Sadavarte, Pune (IN); Nile T. Ackerman, Salida, CO (US); Daniel J. Johannsen, Des Moines, IA (US); Shubham Dubey, Auraiya (IN)

(73) Assignee: DEERE & COMPANY, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,838

(22) Filed: Nov. 22, 2022

(65) Prior Publication Data
US 2023/0082697 A1   Mar. 16, 2023

Related U.S. Application Data

(63) Continuation of application No. 17/249,731, filed on Mar. 10, 2021, now Pat. No. 11,548,014.

(51) Int. Cl.
  *B05B 1/14*  (2006.01)
  *A01D 46/10*  (2006.01)

(52) U.S. Cl.
  CPC .............. *B05B 1/14* (2013.01); *A01D 46/10* (2013.01)

(58) Field of Classification Search
  CPC .................................. B05B 1/14; A01D 46/10

USPC ........ 239/536, 548, 561, 589, 594; 406/195; 56/13.3, 30, 32
  See application file for complete search history.

(56) References Cited

U.S. PATENT DOCUMENTS

| | | | | |
|---|---|---|---|---|
| 796,207 | A * | 8/1905 | Harbour | B65G 53/24 |
| | | | | 56/30 |
| 1,256,438 | A * | 2/1918 | Chaney | A01D 46/10 |
| | | | | 56/32 |
| 1,278,175 | A * | 9/1918 | Baron | A01D 46/28 |
| | | | | 56/30 |
| 3,515,437 | A | 6/1970 | Copley et al. | |
| 4,037,667 | A * | 7/1977 | Gonsalves | A01D 34/84 |
| | | | | 239/594 |
| 4,928,459 | A * | 5/1990 | Thedford | A01D 46/14 |
| | | | | 56/32 |
| 5,094,064 | A * | 3/1992 | Thedford | A01D 46/08 |
| | | | | 56/30 |
| 11,548,014 | B2 * | 1/2023 | Mate | A01D 46/10 |

* cited by examiner

*Primary Examiner* — Steven J Ganey (57) ABSTRACT

Nozzles for an air duct arrangement of an air conveying system may include a first outlet nozzle that is divided into a plurality of chambers are disclosed. The plurality of chambers formed by the outlet provide for a more uniform flow of air exiting the outlet, which generates a greater induced air flow in an associated section of duct. An orientation of a second outlet relative to an inlet of the nozzle provides for a reduced head loss within the nozzle, thereby providing for reduced backpressure within the nozzle and, consequently, a reduced power consumption associated with generating a desired airflow through the nozzle.

20 Claims, 13 Drawing Sheets

NOZZLE

CROSS-REFERENCE TO RELATED APPLICATIONS

This application is a continuation of prior application Ser. No. 17/249,731, filed Mar. 10, 2021, the entire contents of which are incorporated herein by reference.

FIELD OF THE DISCLOSURE

The present disclosure relates generally to nozzles and, particularly, for nozzles for use with an agricultural machine.

BACKGROUND OF THE DISCLOSURE

Cotton harvesters are used to harvest cotton. Some cotton harvesters include an air conveyor system used to transport harvested cotton to a storage area of the cotton harvester.

SUMMARY OF THE DISCLOSURE

An aspect of the present disclosure is directed to a nozzle for an agricultural machine. The nozzle may include a U-shaped body, an inlet formed at a first end of the U-shaped body, a first outlet formed at a second end of the U-shaped body opposite the first end, and a second outlet formed in the U-shaped body and disposed between the inlet and the first outlet. The inlet may define a first datum plane having a first orthogonal coordinate system. The first outlet may define a second datum plane, and the second outlet may define a third datum plane. The first orthogonal coordinate system may include a first orthogonal axis, a second orthogonal axis, and a third orthogonal axis. The first outlet may have a height and a width that is perpendicular to the height. The third datum plane may be angularly offset from the first datum plane by a first angular amount within a range of approximately 50° to 70° about a first line parallel to the first orthogonal axis of the first orthogonal coordinate system, by a second angular amount within a range of approximately 39.1° to 59.1° about a second line parallel to the second orthogonal axis of the first orthogonal coordinate system, and by a third angular amount within a range of approximately 23.7° to 43.7° about a third line parallel to the third orthogonal axis of the first orthogonal coordinate system.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to nozzles, particularly to nozzles used in cotton harvesters, such as cotton pickers. The nozzle forms part of an air duct arrangement of an air conveying system that is used to transport harvested cotton to a storage location, such as an accumulator of the cotton harvester.

The nozzles within the scope of the present disclosure provide improved performance by producing a more uniform air distribution at a first outlet of the nozzle as well as increased performance, for example, in the context of reduced head losses, at a second outlet as a result of a position, an orientation, or both of the second outlet along the nozzle.

Figure 1:
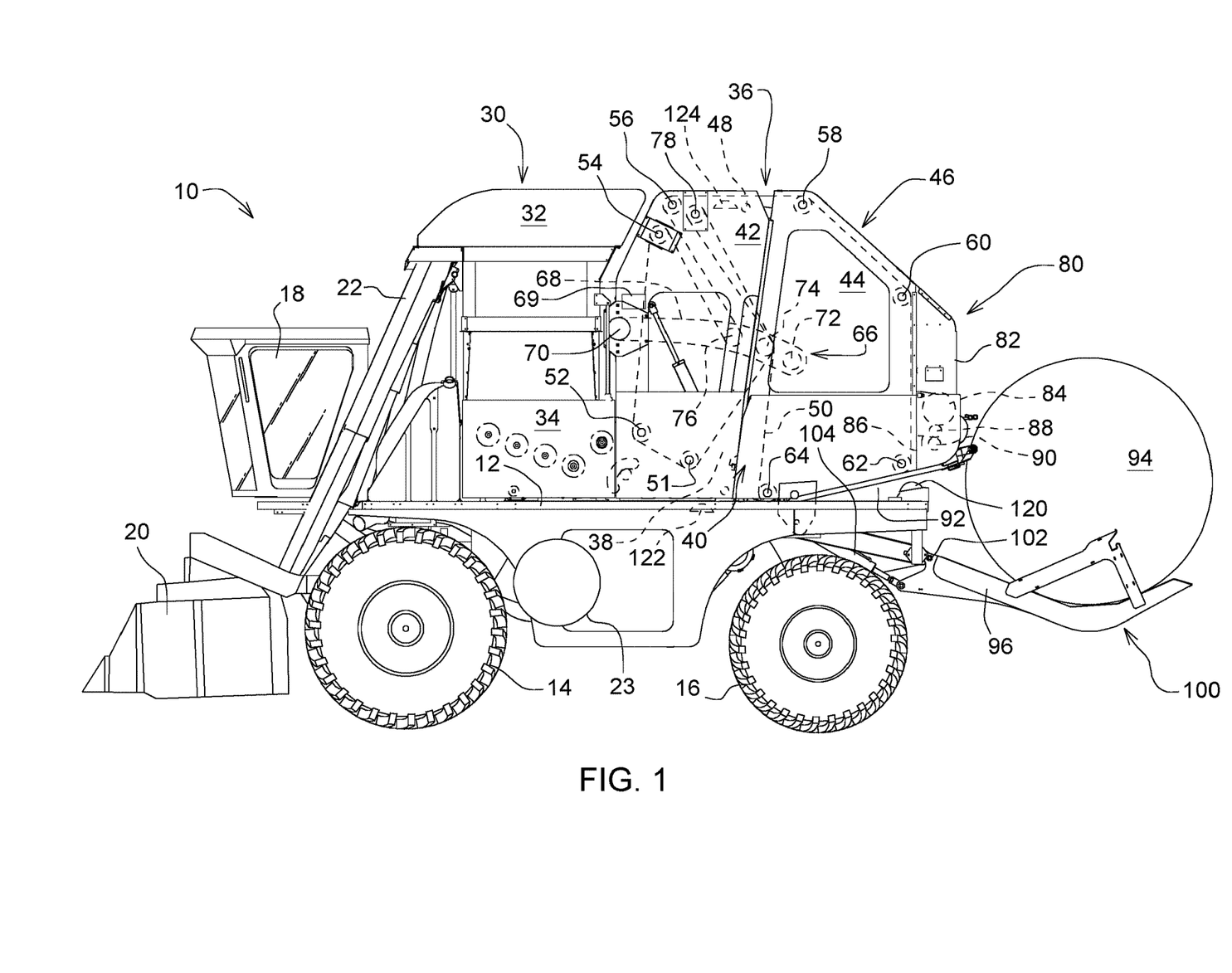
FIG. 1 is a schematic side view of an example seed cotton harvester, according to some implementations of the present disclosure.

FIG. 1 is a schematic side view of an example self-propelled cotton harvester 10. The cotton harvester 10 includes a main frame 12 supported for movement by forward drive wheels 14 and rear steerable wheels 16. Although the example cotton harvester 10 is described as including wheels 14 and 16, in other implementation, other types of ground traction devices may be used. For example, in other implementations, tracks may be used to propel the cotton harvester, steer the cotton harvester, or both.

The cotton harvester 10 also includes an operator's station or cab 18 that is supported at a forward location on an elevated region of the frame 12 so as to provide an operator with a clear view of a cotton harvesting head 20 mounted to a forward end of the frame 12. The cotton harvester 10 also includes an air conveying system that includes air duct arrangement 22. The air conveying system includes a cotton conveying fan 23. The cotton conveying fan 23 generates an air flow that is used to transport harvested cotton through the air duct arrangement 22. The cotton harvesting head 20 operates to remove cotton from plants and to direct the removed cotton into the air conveying system.

An upright cotton accumulator arrangement 30 with an upper inlet structure 32 and a metering floor 34 is supported on the frame 12 behind the cab 18 for receiving the harvested cotton from the air duct arrangement 22. A selectively operable cotton processor 36 is supported rearward of the accumulator arrangement 30. The cotton processor 36 is illustrated as a cylindrical module and operates to form bales of the harvested cotton. The accumulator arrangement 30 stores cotton, and the metering floor 34 uniformly distributes the cotton into a module-forming chamber 38 by way of a chamber inlet 40.

The module-forming chamber 38 is broadly similar to the bale-forming arrangement of the large round baler disclosed in U.S. Pat. No. 5,979,141, granted 9 Nov. 1999 (the entire contents of which are incorporated herein by reference), in that module-forming chamber 38 includes opposite sides having a forward region defined by a pair fixed, transversely spaced side walls 42, which are joined to the main frame 12. The module-forming chamber 38 also includes a rear region defined by a pair of transversely spaced side walls 44 that form opposite sides of a discharge gate 46. The discharge gate 46 is mounted to an upper rear location of the fixed side walls 42 for pivoting vertically about a horizontal axis defined by a pivot assembly 48. The discharge gate 46 is moveable between a lowered, module forming position, as shown, and a raised, module discharge position. The circumference of the module-forming chamber 38 is defined by a module-forming arrangement including a plurality of endless belts 50 supported in a side-by-side relationship across a support roll arrangement. The support roll arrangement includes a plurality of fixed rolls and a plurality of movable rolls. Specifically, proceeding clockwise from an upper boundary of the chamber inlet 40, the fixed rolls include a bottom front roll 51, a lower front roll 52, an upper front roll 54, and a top front roll 56. Each of the rolls 51, 52, 54, and 56 extend between and have opposite ends rotatably mounted to the fixed side walls 42. Continuing on, the fixed rolls further include a top front gate roll 58, an upper rear gate roll 60, a bottom rear gate roll 62, and a bottom front gate roll 64. Each of the fixed rolls 58, 60, 62, and 64 extend between and have opposite ends rotatably mounted to the gate side walls 44.

The cotton harvester 10 also includes a belt tensioning arm arrangement 66. The belt tensioning arm arrangement 66 includes a pair of transversely spaced arms 68 having forward ends joined to a transverse tube that extends between and is pivotally mounted to, as at a pivot arrangement 70, a middle front region of the fixed side walls 42. The plurality of movable rolls comprise three rolls 72, 74, and 76 that extend between and have opposite ends respectively rotatably mounted to the arms 68 of the tensioning arm arrangement 66. The roll 72 is located at a rear end of the arms 68. The roll 74 is positioned in adjacent spaced relationship to the roll 72, and the roll 76 is spaced toward the pivot arrangement 70 from the roll 74.

Beginning at the bottom front roll 51, the endless, module-forming belts 50 are looped under the roll 51 and include an outer run which is engaged serially with the lower front roll 52, the upper front roll 54, the movable roll 76, the top front roll 56, the top front gate roll 58, the upper rear gate roll 60, the lower rear gate roll 62, and the lower front gate roll 64. An inner run of the belts 50 includes a loop engaged over a top rear fixed roll 78, which extends between an upper rear region of the fixed side walls 42, with the loop being positioned between the movable rolls 72 and 74. As shown, the tensioning arm arrangement 66 is in an initial, lowered position corresponding to when the module-forming chamber 38 is in an empty condition, with the module-forming belts defining a generally triangular shape, as viewed from the side. The tensioning arm arrangement 66 includes tensioning elements, such hydraulic cylinders, springs (not shown), or both, which are mounted between the fixed walls 42 and the arms 68 so as to yieldably resist upward movement of the arms 68 as the module-forming chamber 38 becomes filled with cotton. As shown, one or more of the fixed rolls are driven so as to cause the belts 50 to be driven, with the drive direction being such as to cause the incoming cotton to travel counterclockwise (as viewed in FIG. 1) as cotton is added as a spiral layer to the growing cotton module. As the module grows within the chamber 38, the arms 68 of the tensioning arm arrangement 66 rotate counterclockwise (as viewed in FIG. 1) until a module having a predetermined diameter has been formed in the chamber 38. A diameter of the growing module is sensed by a module size sensor 69.

Figure 2:
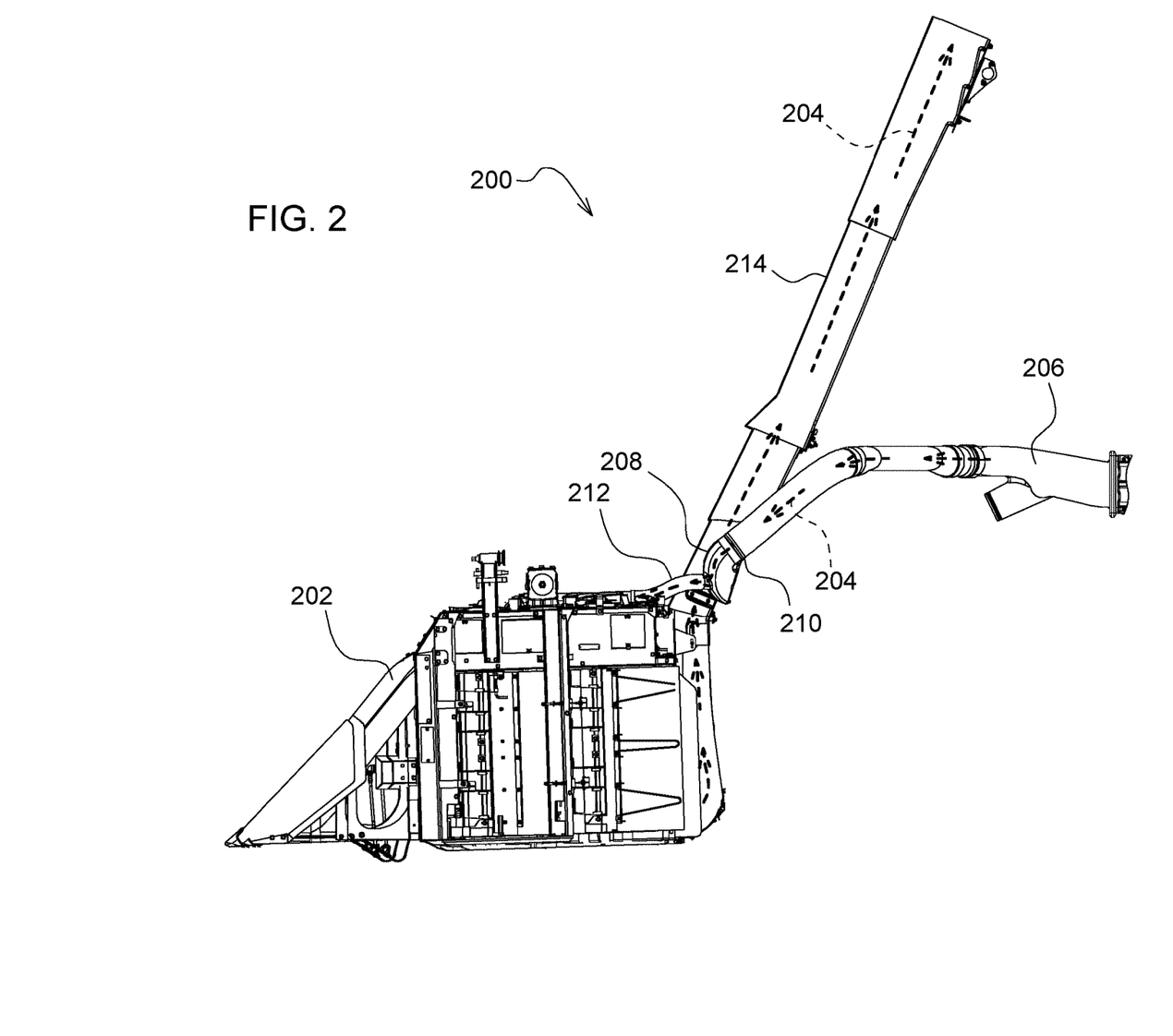
FIGS. 2 and 3 are opposite side views of a portion of an example air duct arrangement of an air conveying system, according to some implementations of the present disclosure.
Figure 3:
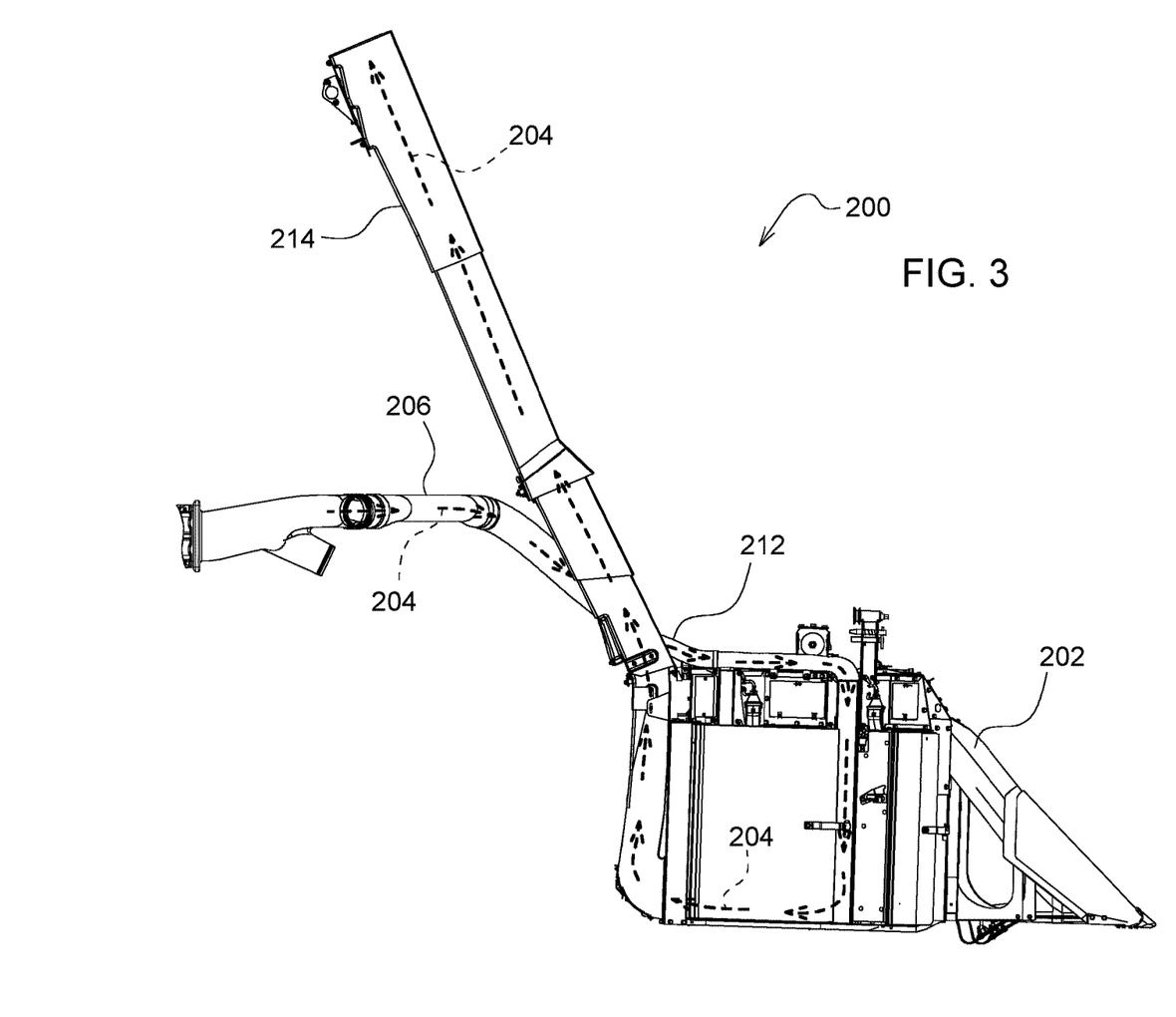

FIGS. 2 and 3 are opposing side views of a portion an air duct arrangement 200 of an air conveying system and a cotton harvesting head 202 for a cotton harvester. The air duct arrangement 200 is coupled to the cotton harvesting head 202. The air duct arrangement 200 and the cotton harvesting head 202 may be similar to the air duct arrangement 22 and cotton harvesting head 20, respectively, described in the context of the cotton harvester 10 of FIG. 1. As shown in FIGS. 2 and 3, arrows 204 indicate a direction of air flow within air duct arrangement 200 and cotton harvesting head 202.

The air duct arrangement 200 includes a first air duct 206 that conducts a flow of air from an air source, such as a cotton conveying fan (which may be similar to the cotton conveying fan 23 discussed above), towards to a nozzle 208. The nozzle 208 is disposed at a distal end 210 of the first air duct 206. A second air duct 212 extends from the nozzle 208 towards the cotton harvesting head 202. A third air duct 214 conducts air from the nozzle 208 towards a cotton accumulator arrangement, which may be similar to the cotton accumulator arrangement 30 described earlier.

As shown in FIG. 3, air flow provided by the second duct 212 is introduced into the cotton harvesting head 202 to transport harvested cotton into the third duct 214. Air flow introduced into the third air duct 214 via the nozzle 218 (as opposed to via the second air duct 212 by way of the cotton harvesting head 202) generates a reduced pressure within the third air duct that operates to draw harvested cotton from the cotton harvesting head 202 into the third air duct 214 for transport to the cotton accumulator arrangement.

Figure 4:
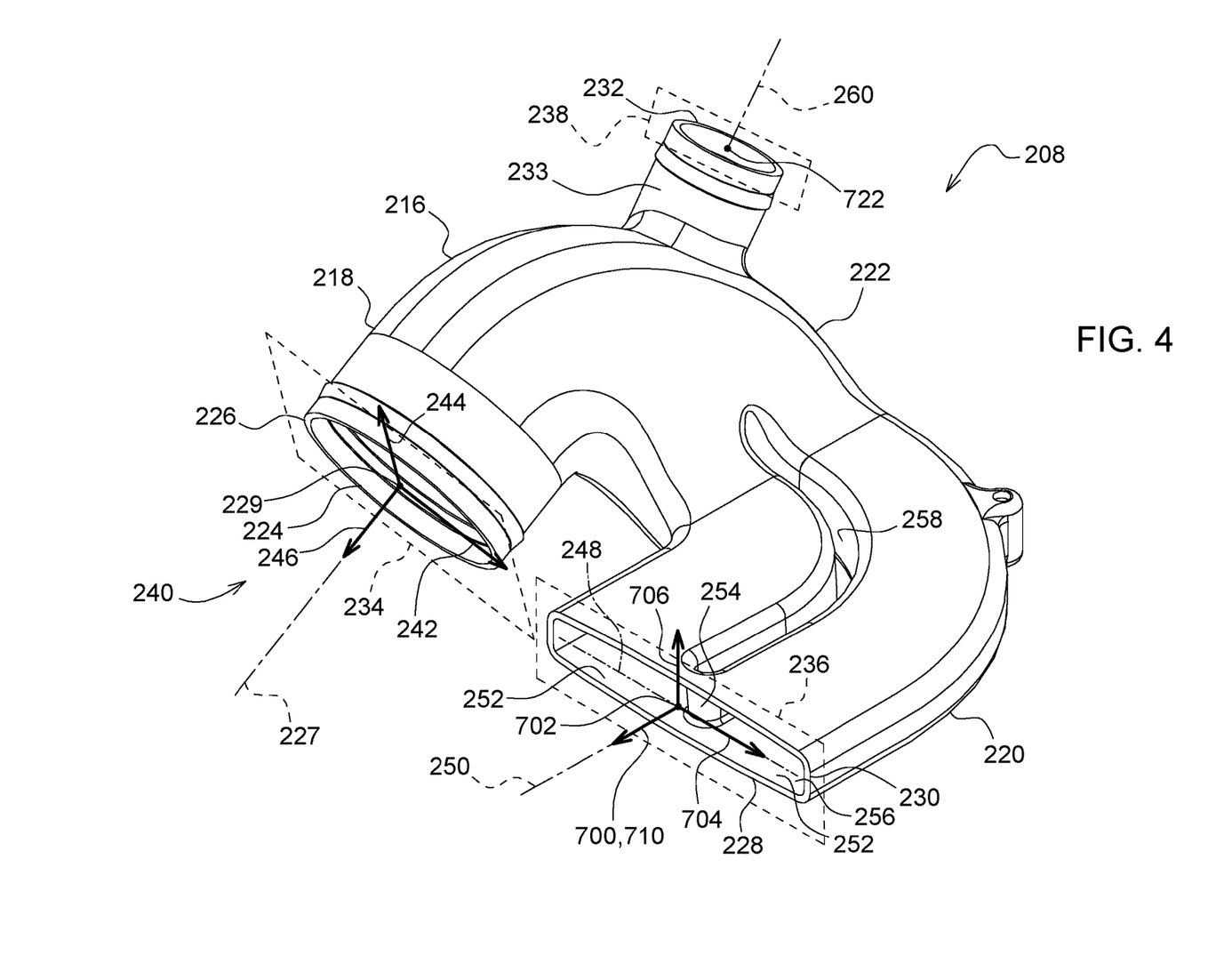
FIG. 4 is a perspective view of an example nozzle, according to some implementations of the present disclosure.

FIG. 4 is a perspective view of an example nozzle 208. The nozzle 208 includes a body 216 having a first portion 218, a second portion 220, and a transition portion 222 extending between the first portion 218 and the second portion 220. The body 216 is generally shaped in the form of a U. The first portion 220 forms an inlet 224 at a first end 226 of the body 216. The second portion 220 forms a first outlet 228 at a second end 230 of the body 216. A second outlet 232 is formed in the body 216 and is disposed between the inlet 224 and the first outlet 228.

The inlet 224 of the nozzle 208 defines a first datum plane 234. The first outlet 224 defines a second datum plane 236, and the second outlet 232 defines a third datum plane 238. In the illustrated example, the inlet 224 defines an opening having a circular shape. In some implementations, an inner diameter of the inlet 224 may be within a range of approximately 140.0 mm (5.5 in.) to 165.1 mm (6.5 in.). In some implementations, the diameter of the inlet 224 may be 152.4 mm (6.0 in.). In still other implementations, the diameter of the inlet 224 may be greater than or less than the indicated range. A size of the inlet 224 may be selected in accordance with a particular application of the nozzle 208. The first outlet 224 defines an opening with an elongated shape, and the second outlet 232 defines an opening having a circular shape. In some implementations, a diameter of the second outlet 232 may be within a range of approximately 57.2 mm (2.25 in.) and 76.2 mm (3.0 in.). In some implementations, the diameter of the second outlet 232 may be 63.5 mm (2.5 in.). In still other implementations, the diameter of the second outlet 232 may be greater than or less than the indicated range. Further, in other implementations, the first outlet 224 and the second outlet 232 may define openings having shapes other than a circular shape.

A first orthogonal coordinate system 240 is defined on the first datum plane 234. The first orthogonal coordinate system 240 include an x-axis 242 extending along a width of the inlet 224 and a y-axis 244 provided along the first datum plane 234. The y-axis 244 extends along a height of the inlet 224 and is perpendicular to the x-axis 242. The first orthogonal coordinate system 240 also includes a z-axis 246 that is perpendicular to both the x-axis 242 and the y-axis 244 and extends perpendicularly from the first datum plane 234. In the illustrated example, the z-axis 246 extends along a centerline 227 of the inlet 224. The first orthogonal coordinate system includes an origin 229 at a location where the centerline 227 intersects the first datum plane 234.

Further, the x-axis 242 is parallel to a line 248 that defines a width of the first outlet 224. The width of the first outlet 224 aligns with an x-axis of a second orthogonal coordinate system, discussed in more detail later. The line 248 extends along the second datum plane 236. A centerline 250 of the first outlet 224 extends perpendicular to the second datum plane 234 and the line 248. The second outlet 232 defines a centerline 260 that extends perpendicular to third datum plane 238.

The first outlet 228 is divided into separate chambers 252 by a partition 254. In the illustrated example, the partition 254 extends along the second portion 220 through a passage 256 formed in the second portion 220. The partition 254 extends along the second portion 220 to the transition portion 222. In some implementations, the partition 254 may extend at least partially into the transition portion 222. In the illustrated example, the partition 254 divides the first outlet 228 and the passage 256 into two separate chambers 252. In other implementations, the first outlet 228, the passage 256, or both may be divided into more than two chambers 252.

As shown in FIG. 4, the partition 254 defines an opening 258 in the body 216 of the nozzle 208. In other implementations, the partition 254 may not form an opening in the body 216 of the nozzle 208. The partition 254 operates to provide a more uniform distribution of air across the first outlet 228 as the air exits from the first outlet 228. The more uniform profile of air exiting from the first outlet 228 and into the second duct 214 induces a greater pressure reduction in the second duct 214 to cause improved flow of harvested cotton through the second duct 214. For example, with a constant power setting of a cotton conveying fan, the nozzle 208 is operable to generate an increased pressure reduction within the second duct 214 compared to a nozzle lacking a divided first outlet. Similarly, a cotton conveying fan may be operated at a reduced power setting to generate a reduced pressure within the second duct as compared to an increased power setting needed to produce a similar level of pressure reduction from a nozzle lacking a divided first output.

Figure 5:
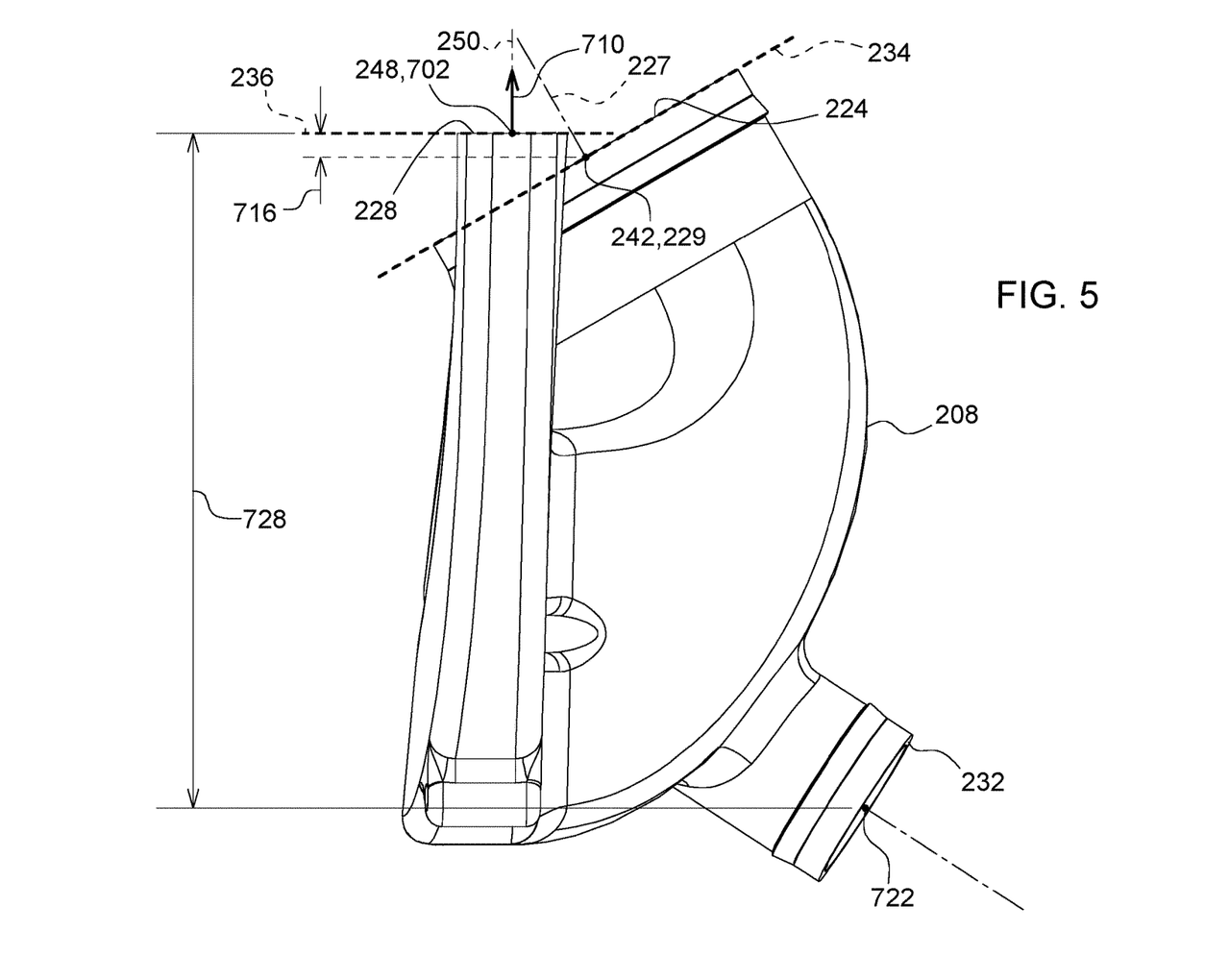
FIG. 5 is a side view of the example nozzle of FIG. 4.

FIG. 5 is a side view of the example nozzle 208 shown in FIG. 4. In the illustrated example, the second datum plane 236 of the first outlet 224 is angularly offset from the first datum plane 234 of the inlet 224 by a rotation of approximately 30.0° about a line parallel to the x-axis 242 of the first orthogonal coordinate system 240. Thus, the centerline 250 of the first outlet 224 is angularly offset from the centerline 227 of the inlet 228 by a rotation of approximately 30.0° about a line parallel to the x-axis 242 of the first orthogonal coordinate system 240. In other implementations, the amount of angular rotation of the second datum plane 242 relative to the first datum plane 242 may be greater or less than 30.0°.

Figure 6:
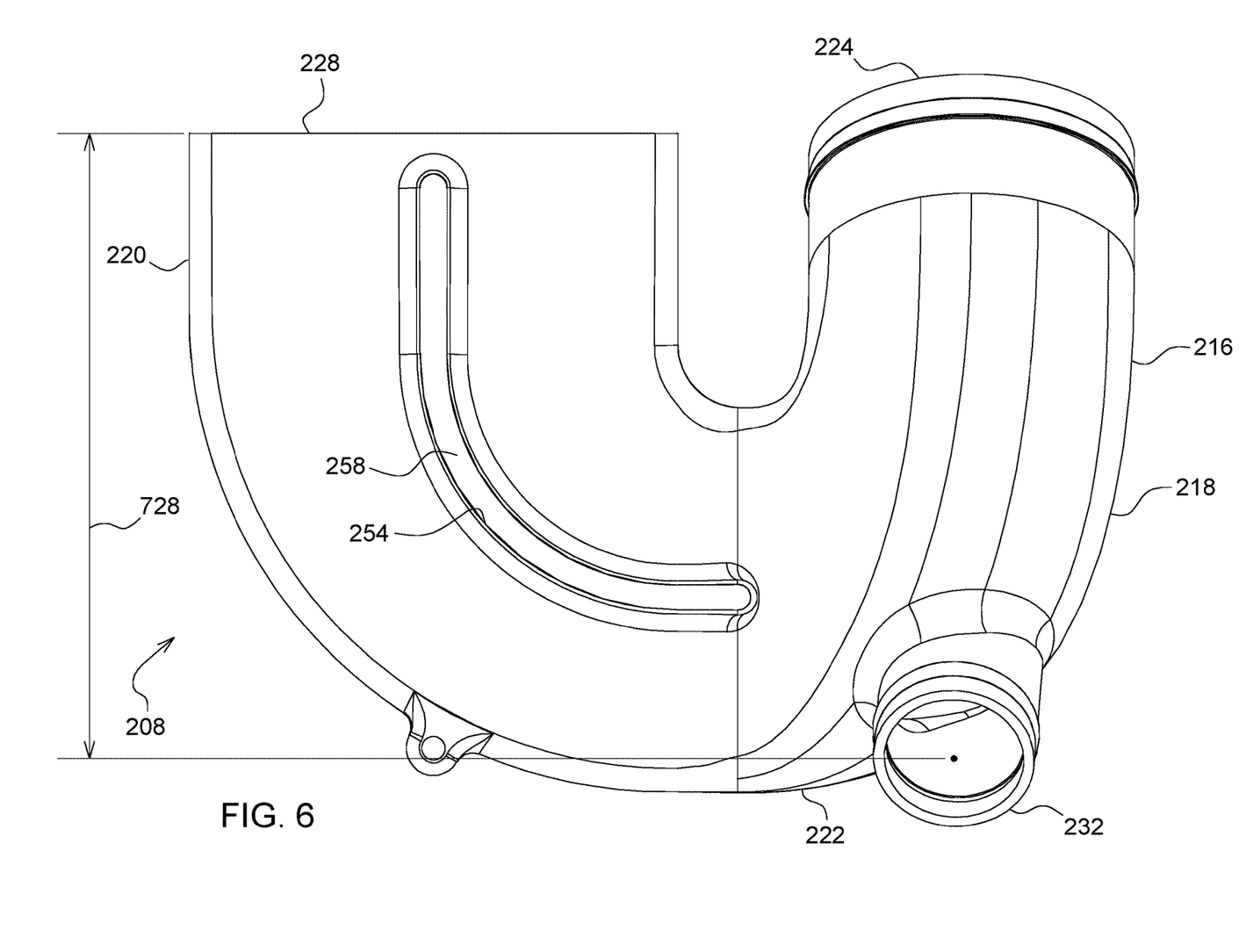
FIG. 6 is a top view of the example nozzle of FIG. 4.
Figure 7:
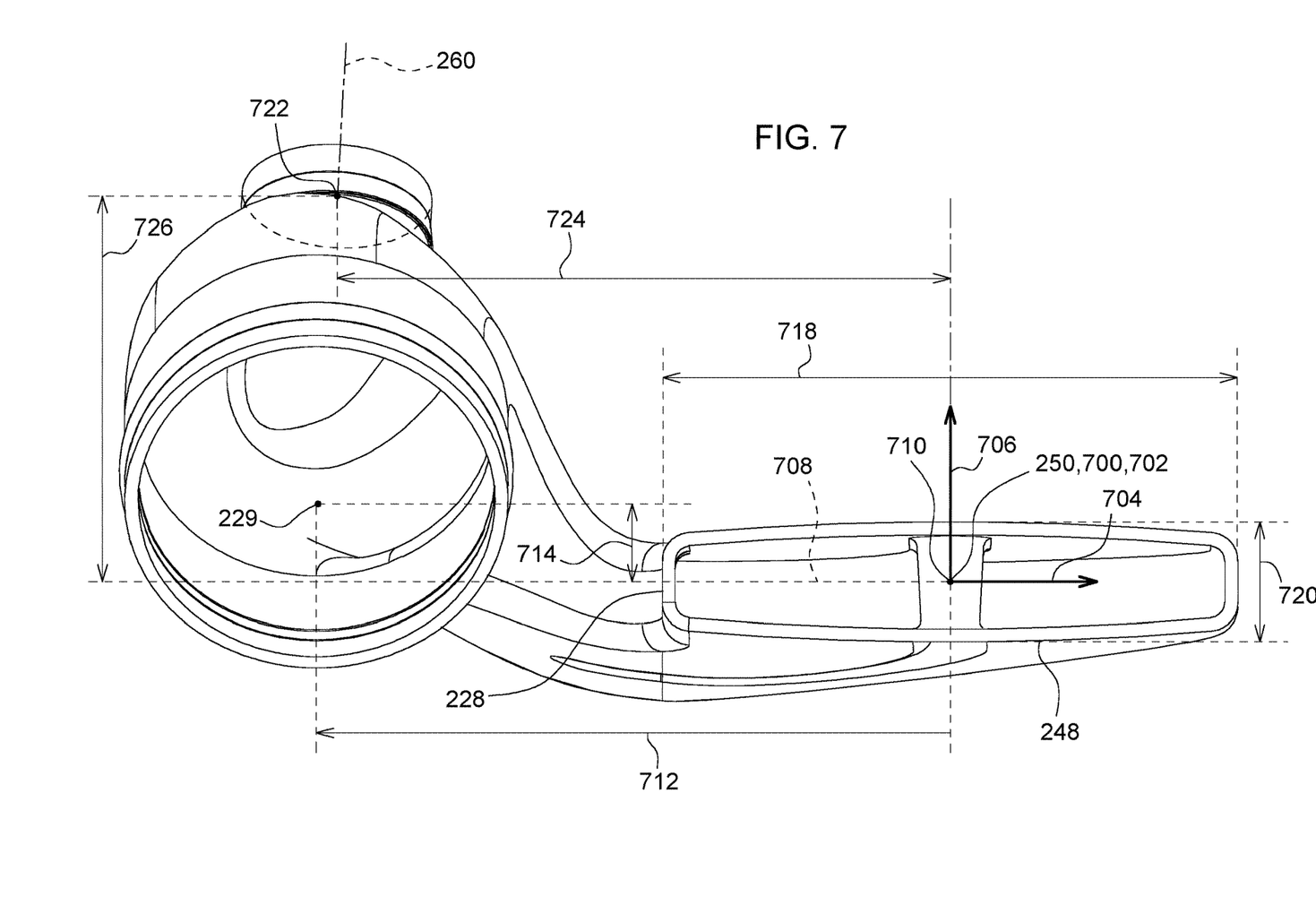
FIG. 7 a front view of the example nozzle of FIG. 4.

FIG. 6 is a top view of the example nozzle 208 shown in FIG. 4. FIG. 7 is a front view of the nozzle 20 shown in FIG. 4. A second orthogonal coordinate system 700 is provided on the second datum plane 236 having an origin 702 at the intersection of the centerline 250 of the first outlet 228 and the second datum plane 236. An x-axis 704 of the second orthogonal coordinate system 700 is parallel to and aligned with the line 248 defining the width of the first outlet 228. A y-axis 706 of the second orthogonal coordinate system 700 is on the second datum plane 236 and extends perpendicularly from the x-axis 704. A z-axis 710 extends perpendicularly to the x-axis 704 and the y-axis 706 along the centerline 250.

With respect to the second orthogonal coordinate system 700, an x-axis component 712, measured along the x-axis 704, of a distance between the origin 702 of the second coordinate system 700 and the origin 229 of the first orthogonal coordinate system 240 is shown. In some implementations, the x-axis component 712 may be within a range of approximately 240.0 mm (9.4 in.) to 260.0 mm (10.2 in.). In some implementations, the x-axis component 712 is approximately 249.3 mm (9.8 in.). In still other implementations, the x-axis component 712 may be greater than or less than the indicated range. A y-axis component 714, measured along the y-axis 706, of the distance between in the origin 702 and the origin 229 may be within a range of approximately 21.5 mm (0.8 in.) to 41.5 mm (1.6 in.). In some implementations, the y-axis component 714 is approximately 31.5 mm (1.2 in.). In still other implementations, the y-axis component 714 may be greater than or less than the indicated range. A z-axis component 716 (shown in FIG. 5), measured along the z-axis 710, of the distance between the origin 702 and the origin 229 may be within a range of approximately 14.7 mm (0.6 in.) to 34.7 mm (1.4 in.). In some implementations, the z-axis component 716 is approximately 24.7 mm (1.0 in.). In still other implementations, the z-axis component 716 may be greater than or less than the indicated range.

Returning to FIG. 7, a width 718 of the first outlet 228 may be within a range of approximately 222 mm (8.7 in.) to 232 mm (9.1 in.). In some implementations, the width 718 of the first outlet 228 may be approximately 227 mm (8.9 in.). In still other implementations, the width 718 of the first outlet 228 may be greater than or less than the indicated range. A height 720 of the first outlet 228 may be within a range of approximately 42 mm (1.7 in.) to 52 mm (2.0 in.) In some implementations, the height 720 of the first outlet 228 is approximately 47 mm (1.9 in.). In still other implementations, the height 720 of the first outlet 228 may be greater than or less than the indicated range. In some implementations, a wall-thickness of the nozzle 208 defining the first outlet 228 may be 5.0 mm (0.2 in.). Thus, in some implementations, an inner dimension of the width of the first outlet 228 is within a range of 212 mm (8.3 in.) to 222 mm (8.7 in.). In some instances, an inner dimension of the width of the first outlet is 217 mm (8.5 in.). In other implementations, the wall thickness may be greater than or less than 5.0 mm (0.2 in.). Similarly, in some implementations, an inner dimension of the height of the first outlet 228 is within a range of 33 mm (1.3 in.) and 43 mm (1.7 in.). Thus, in some implementations, the inner dimension of the height of the first outlet 228 is 38 mm (1.5 in.). In the illustrated example, the height 720 and width 718 are measured along the y-axis 706 and the x-axis 704, respectively. Still further, in some implementations, the inner dimensions of the height and width of the first outlet 228 may be greater than or less than the indicated range. The sizes of the dimensions, both in the context of the height and width of the first outlet 228 and the other dimensions disclosed in the context of the illustrated example nozzle 208 may be varied, for example, in order to provide a desired flow rate through the nozzle 208 or a desired pressure within the nozzle 208.

FIG. 7 also illustrates dimensions associated a distance between the origin 702 of the second orthogonal coordinate system 700 and a point 722. In some implementations, an x-axis component 724, measured along the x-axis 704 of the second orthogonal coordinate system 700, may be within a range of approximately 231.2 mm (9.1 in.) to 251.2 mm (9.9 in.). In some implementations, the x-axis component 724 is approximately 241.2 mm (9.5 in.). In still other implementations, the x-axis component 724 may be greater than or less than the indicated range. A y-axis component 726, measured along the y-axis 706, of the distance between the origin 702 and the point 722 may be within a range of approximately 141.6 mm (5.6 in.) to 161.6 mm (6.4 in.). In some implementations, the y-axis component 726 is approximately 151.6 mm (6.0 in.). In still other implementations, the y-axis component 726 may be greater than or less than the indicated range. A z-axis component 728 (shown in FIGS. 5 and 6), measured along z-axis 710, of the distance between the origin 702 of the second orthogonal coordinate system and the point 722 may be within a range of approximately 279.5 mm (11.0 in.) to 299.5 mm (11.8 in.). In some implementations, the z-axis component 728 may be approximately 289.5 mm (11.4 in.). In still other implementations, the z-axis component 728 may be greater than or less than the indicated range.

Figure 8:
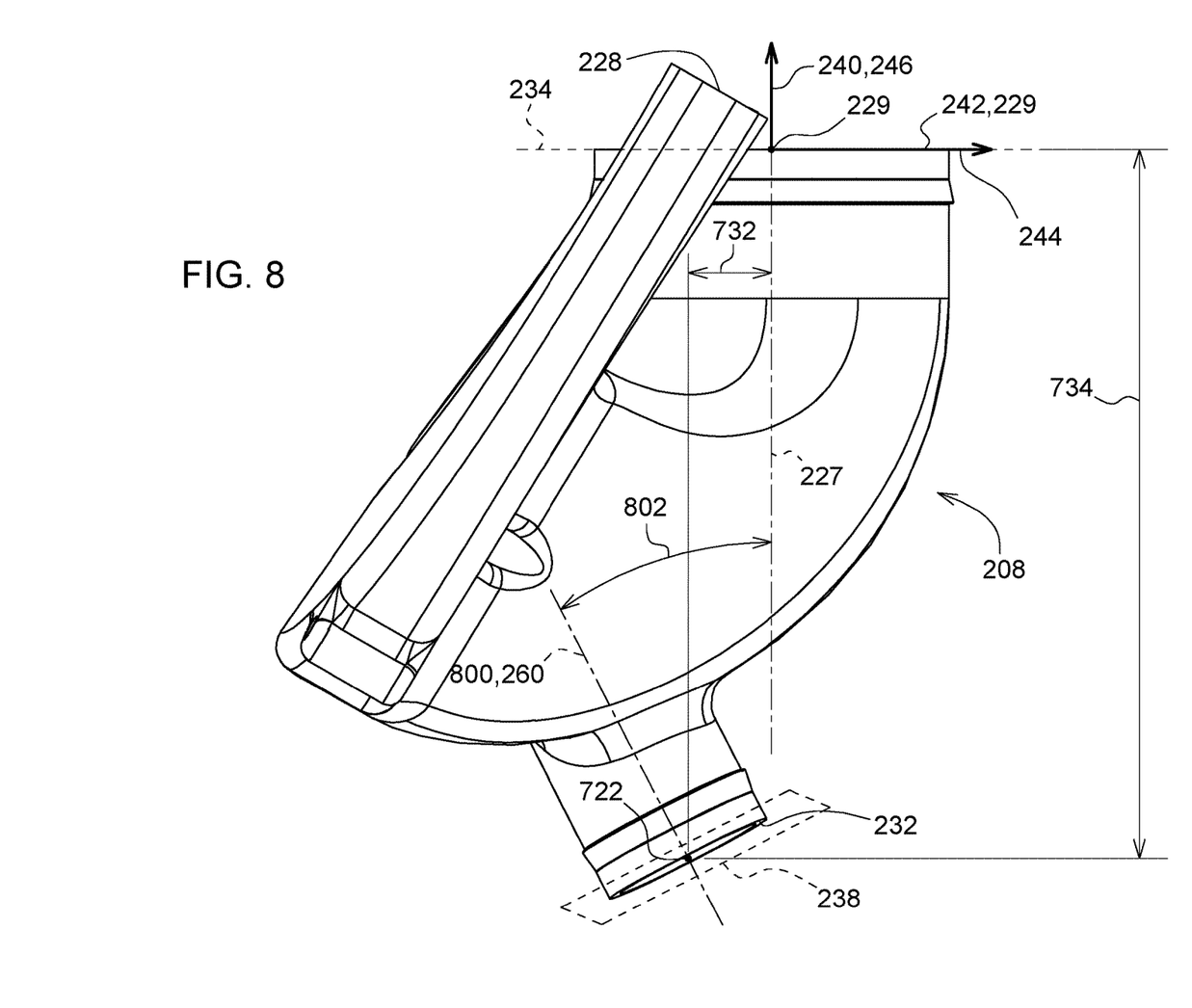
FIG. 8 is another side view of the example nozzle of FIG. 4.
Figure 9:
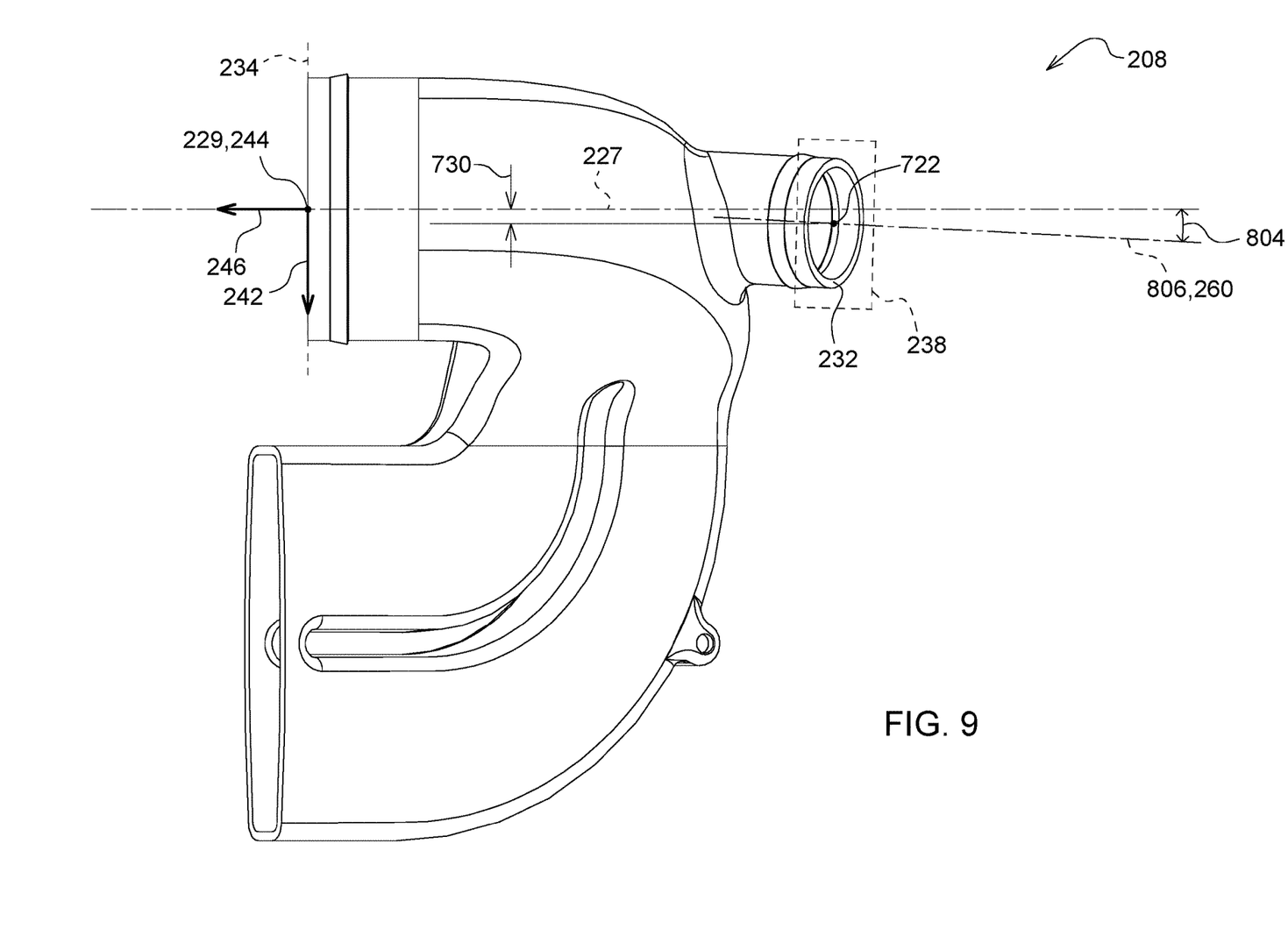
FIGS. 9 and 10 are detail views of the example nozzle of FIG. 4.

FIGS. 8 and 9 illustrate dimensions associated with the point 722 relative to the first orthogonal coordinate system 240. Referring to FIG. 9, in some implementations, an x-axis component 730, measured along the x-axis 242 of the first orthogonal coordinate system 240 from the origin 229, may be within a range of approximately −1.9 mm (−0.1 in.) to 18.1 mm (0.7 in.). In some implementations, the x-axis component 730 is approximately 8.1 mm (0.3 in.). In still other implementations, the x-axis component 730 may be greater than or less than the indicated range. Referring to FIG. 8, a y-axis component 732, measured along the y-axis 244, of the distance between the origin 229 and the point 722 may be within a range of approximately 25.5 mm (1.0 in.) to 45.5 mm (1.8 in.). In some implementations, the y-axis component 732 is approximately 35.5 mm (1.4 in.). In still other implementations, the y-axis component 732 may be greater than or less than the indicated range. A z-axis component 734, measured along the z-axis 246, of the distance between the origin 299 of the first orthogonal coordinate system 240 and the point 722 may be within a range of approximately 291.8 mm (11.5 in.) to 311.8 mm (12.3 in.). In some implementations, the z-axis component 734 may be approximately 301.8 mm (11.9 in.). In still other implementations, the z-axis component 734 may be greater than or less than the indicated range.

Nozzles having the dimensions described above are not intended to limit the scope of the present disclosure but are, rather, provided merely as examples. Particularly, the dimensions and range of dimensions are provided to illustrate some nonlimiting implementations within the scope of the present disclosure. Thus, a nozzle within the scope of the present disclosure may have a configuration that varies from the examples described herein. Consequently, a size and shape of the inlet 242, first outlet 228, and second outlet 232 may vary while still being within the scope of the present disclosure. A distance between or the sizes of the inlet 242, the first outlet 228, and the second outlet 232 may be varied in order to satisfy a size or configuration of an air conveying system and, particularly, an air duct arrangement of an air conveying system. For example, for a larger air duct arrangement that handles a greater volume of air, a physical size, shape, or configuration of the nozzle may vary to accommodate particularities of the air duct arrangement. Conversely, a nozzle of an air duct arrangement that handles a lesser volume of air, a physical size, shape, or configuration of the nozzle may vary to accommodate the differences of the air duct arrangement. Further, an orientation of the inlet 242, the first outlet 228, and the second outlet 232 relative to each other may also vary to accommodate variations in an air duct arrangement. For example, the angle formed between the centerline of the inlet and the centerline of the first outlet, between the centerline of the inlet and the centerline of the second outlet, or between the centerline of the first outlet and the centerline of the second outlet may vary to accommodate a configuration of an air duct arrangement.

Referring to FIG. 4, the second outlet 232 is formed on at a tubular protrusion 233 of the body 216. The tubular protrusion 233 extends from a location of the body 216 near an interface between the first portion 218 and the transition portion 222. An amount by which the tubular protrusion 233 extends from the location of the body 216 may be altered in order to accommodate the nozzle 208 to a particular application. For example, an amount by which the second outlet 232 is offset relative to another part of the body 216, such as the first portion 218 or the transition portion 222, may vary, e.g., the second outlet 232 may be offset a greater or lesser amount than that shown in FIG. 4, in order to accommodate for variations of a system into which the nozzle 208 is to be incorporated, such as an air duct arrangement of an air conveying system.

Figure 10:
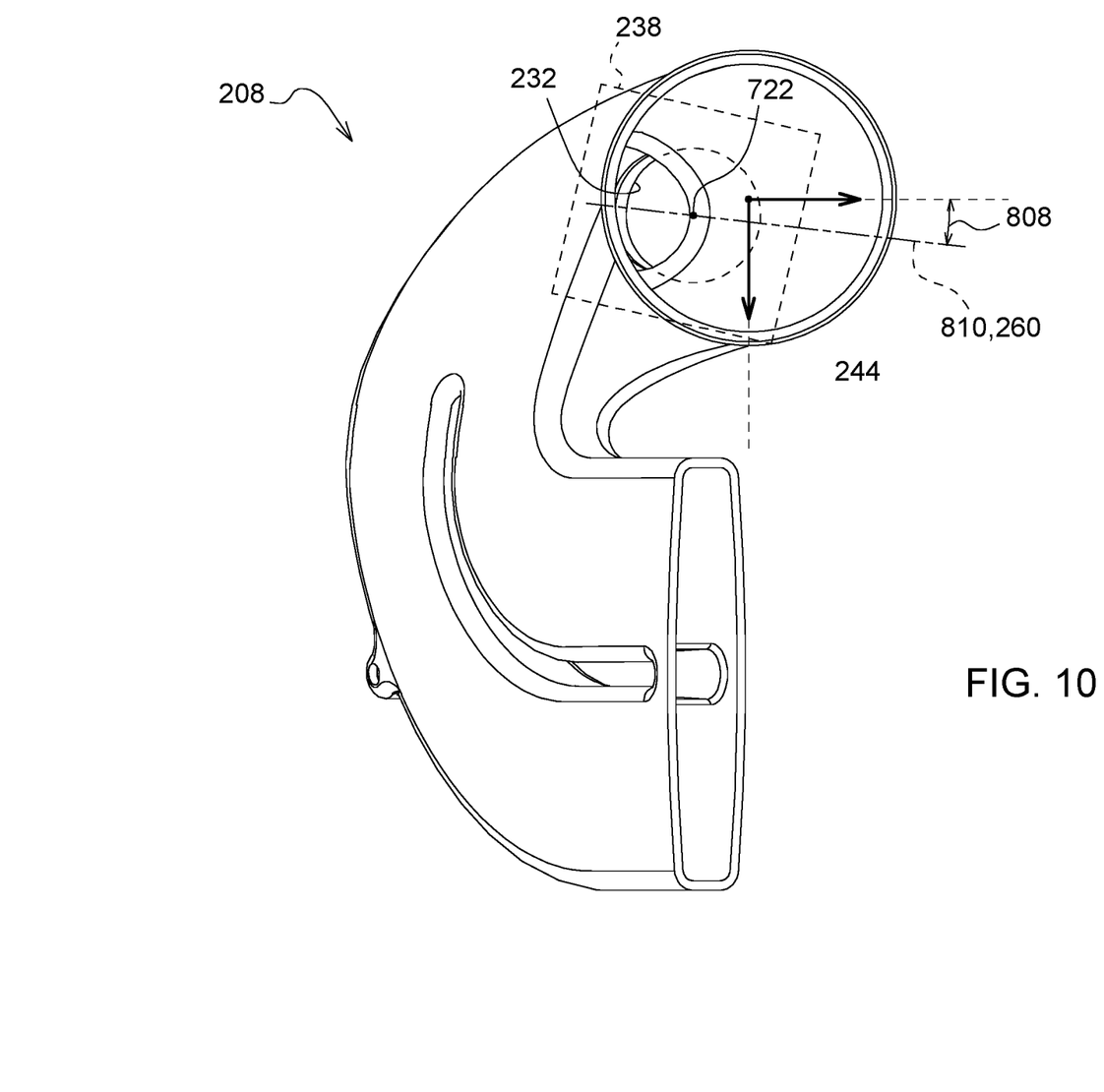
Figure 11:
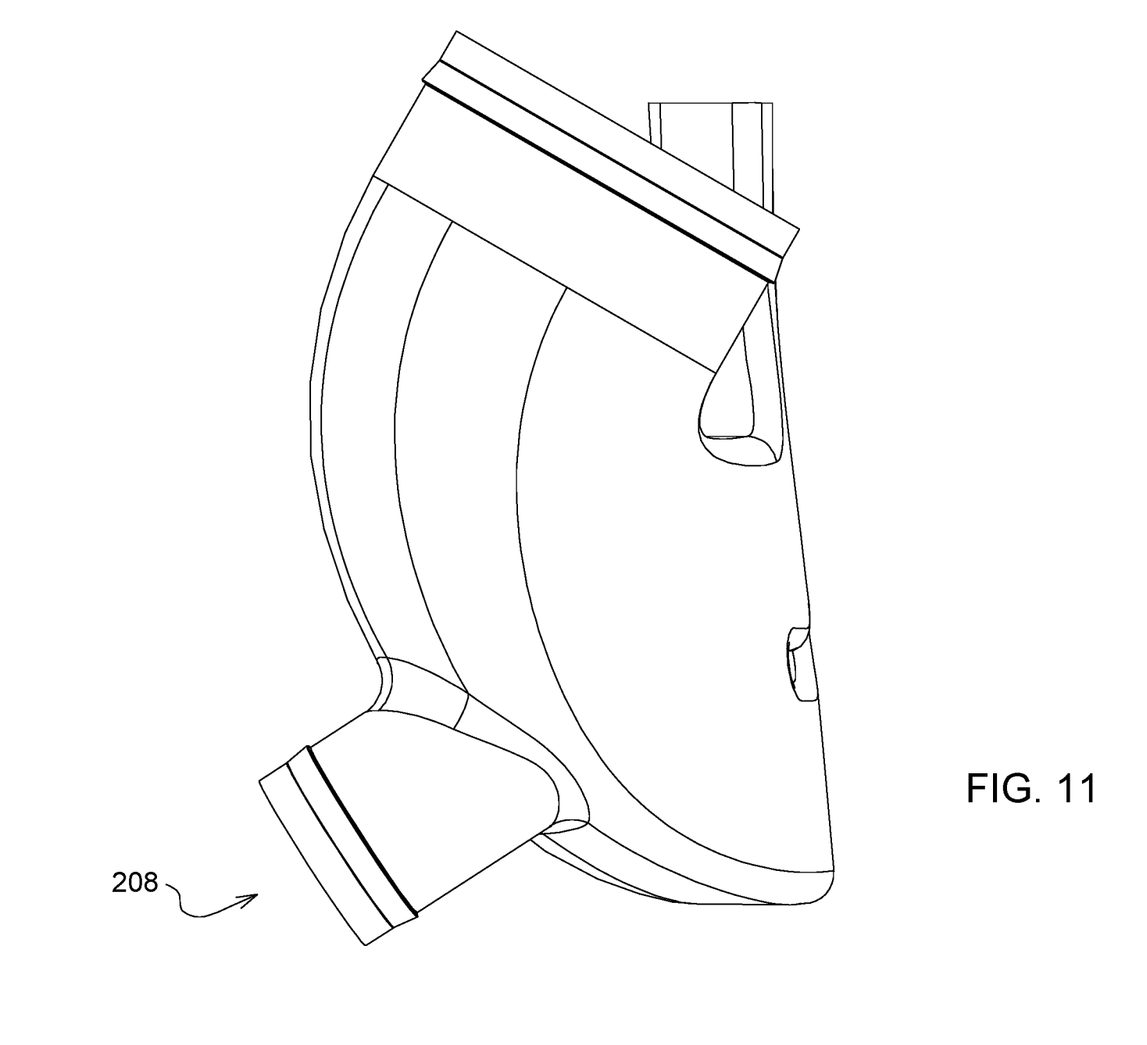
FIG. 11 is another side view of the example nozzle of FIG. 4.
Figure 12:
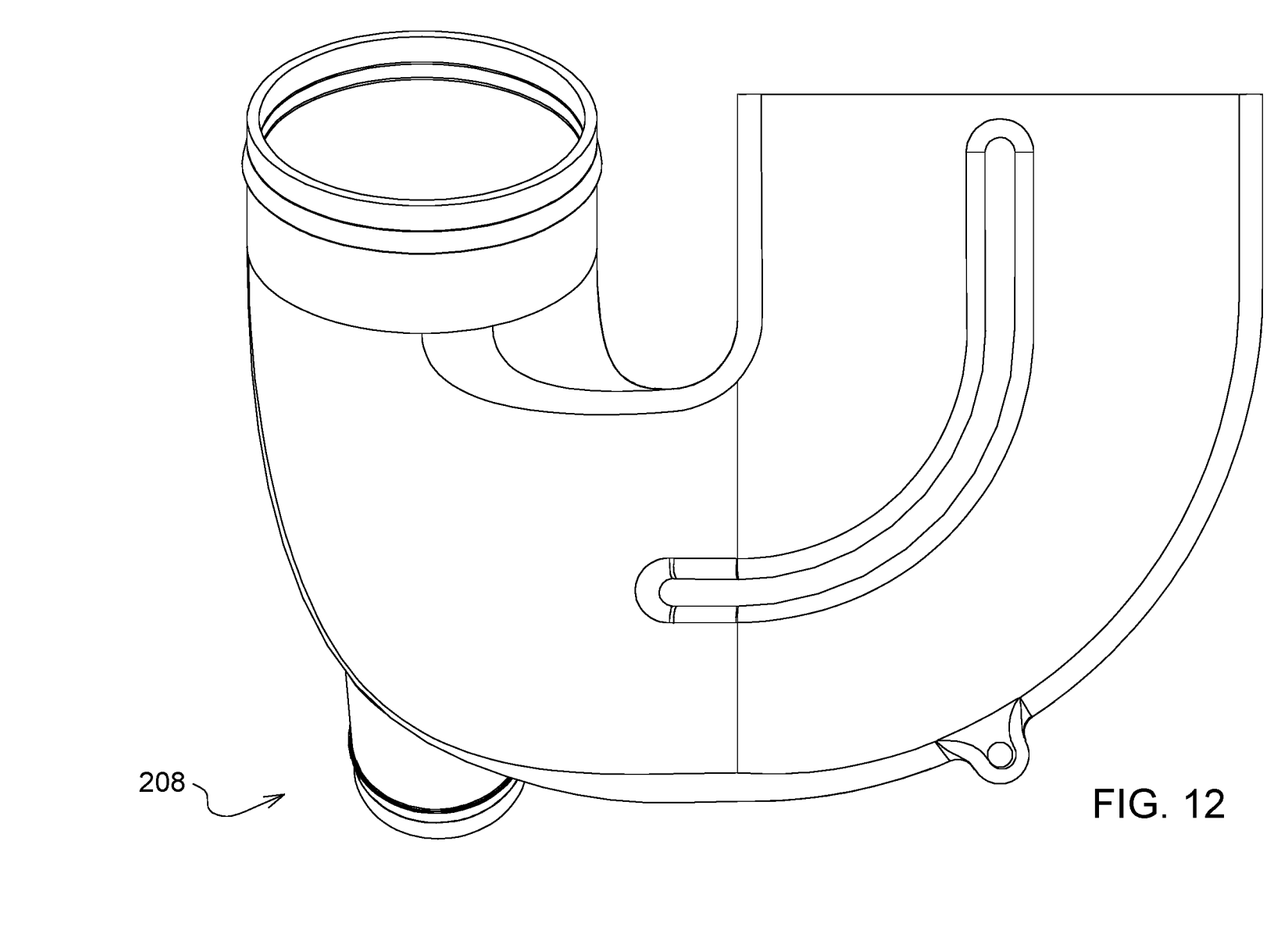
FIG. 12 is a bottom view of the example nozzle of FIG. 4.
Figure 13:
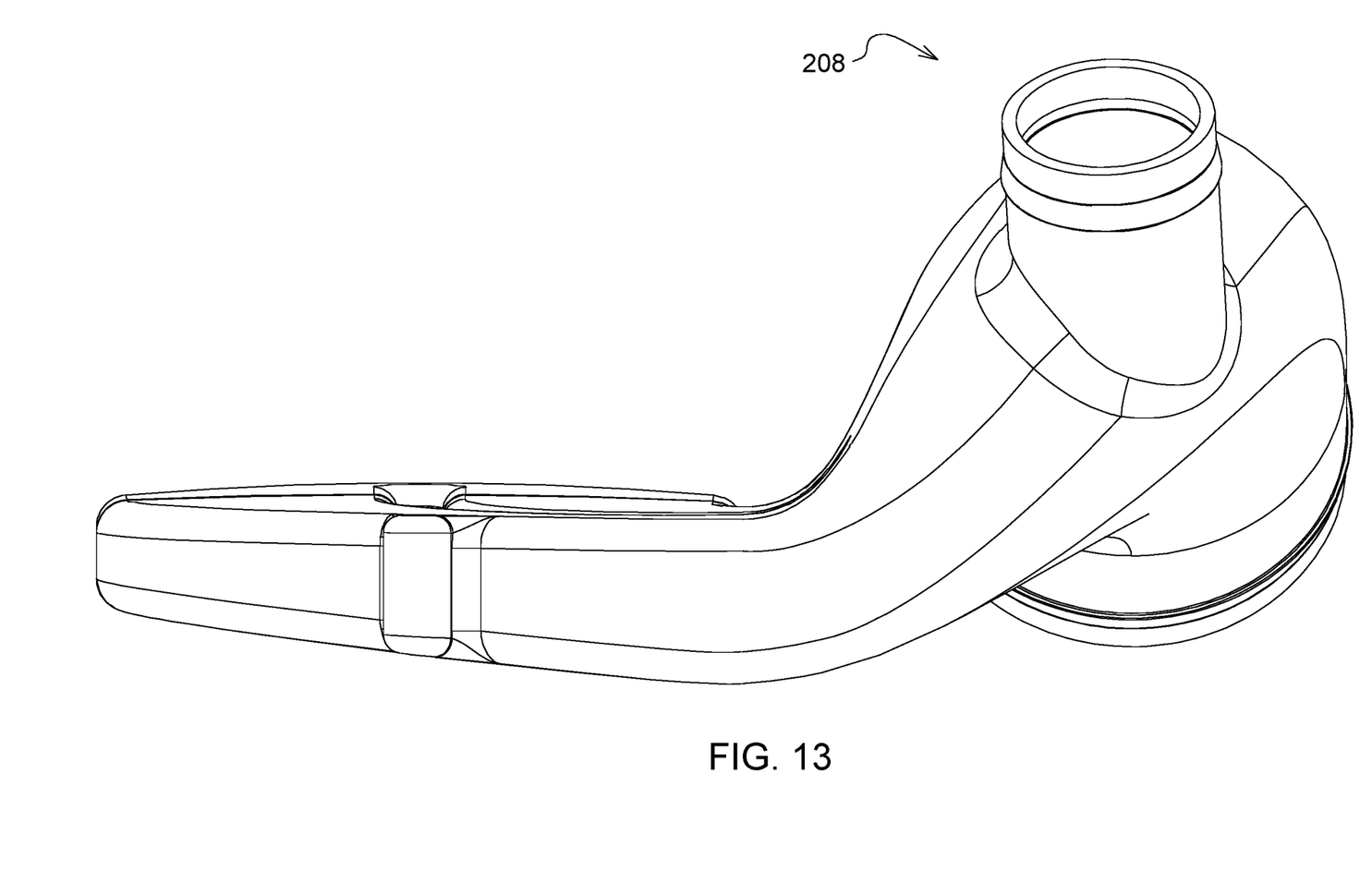
FIG. 13 is a back view of the example nozzle of FIG. 4.

FIGS. 8-10 are detail views of the example nozzle 208 that illustrate angular offsets, along lines parallel to each of the axes of the first coordinate axis system 240, between the first datum plane 234 associated with the inlet 224 and the third datum plane 238 associated with the second outlet 232. FIG. 8 illustrates rotation of the third datum plane 238 relative to the first datum plane 234 about a line parallel to the x-axis 242 of the first orthogonal coordinate system 240. FIG. 9 illustrates rotation of the third datum plane 238 relative to the first datum plane 234 about a line parallel to the y-axis 244 of the first orthogonal coordinate system 240. FIG. 10 illustrates rotation of the third datum plane 238 relative to the first datum plane 234 about a line parallel to the z-axis 246 of the first orthogonal coordinate system 240.

FIG. 8 is a view aligned with a yz plane of the first orthogonal coordinate system 240 that passes through the origin 229. A line 800, representing a projection of the centerline 260 of the second outlet 232 onto the yz plane, defines a first angle 802 of approximately 27.1° with the z-axis 246 of the first orthogonal coordinate system 240. In some implementations, the first angle 802 may be within a range of approximately 17.1° to 37.1°. The first angle 802 represents an amount by which the first datum plane 234 would have to be rotated about a line parallel to the x-axis 242, in addition to rotations about lines parallel to the y-axis 244 and z-axis 246 (described in more detail later), in order to place the first datum plane 234 into an orientation identical to that of the third datum plane 238.

A second angle 804 is illustrated in FIG. 9. FIG. 9 is a view aligned with an xz plane of the first orthogonal coordinate system 240 that passes through the origin 229. A line 806, representing a projection of the centerline 260 of the second outlet 232, defines the second angle 804 of approximately 3.1° with the z-axis 246 of the first orthogonal coordinate system 240. In some implementations, the second angle 804 may be within a range of approximately −6.9° to 13.1°. The second angle 804 represents an amount by which the first datum plane 234 would have to be rotated about a line parallel to the y-axis 244, in addition to rotations about lines parallel to the x-axis 242 and z-axis 246 (described herein), in order to place the first datum plane 234 into an orientation identical to that of the third datum plane 238.

A third angle 808 is illustrated in FIG. 10. FIG. 10 is a view aligned with an xy plane of the first orthogonal coordinate system 240 that passes through the origin 229. A line 810, representing a projection of the centerline 260 of the second outlet 232 on the xy plane, defines the third angle 808 of approximately 5.9° with the y-axis 228 of the first orthogonal coordinate system 240. In some implementations, the third angle 808 may be within a range of approximately −4.1° to 15.9°. The third angle 808 represents an amount by which the first datum plane 234 would have to be rotated about a line parallel to the y-axis 244, in addition to rotations about lines parallel to the x-axis 242 and z-axis 246 (described above), in order to align the first datum plane 234 into an orientation identical to that of the third datum plane 238. Thus, the first, second, and third angles 802, 804, and 808 define an orientation of the centerline 260 of the second outlet 232 relative to the centerline 227 of the inlet 230 in the context of the first orthogonal coordinate system 240.

Words of orientation, such as "up," "down," "top," "bottom," "above," "below," "leading," "trailing," "front," "back," "forward," and "rearward" are used in the context of the illustrated examples as would be understood by one skilled in the art and are not intended to limit the disclosure. For example, for a particular type of vehicle in a conventional configuration and orientation, one skilled in the art would understand these terms as the terms apply in the particular context.

Without in any way limiting the scope, interpretation, or application of the claims appearing below, a technical effect of one or more of the example implementations disclosed herein is providing a nozzle, such as a nozzle for use in an air conveying system of an agricultural vehicle, that generates a more uniform air flow exiting from an outlet of the nozzle. Another technical effect of one or more of the example implementations disclosed herein is providing a nozzle, such as a nozzle for use in an air conveying system of an agricultural vehicle, that reduces backpressure associated with another outlet of the nozzle. Consequently, nozzles within the scope of the present disclosure provide for improved performance, thereby reducing power consumption associated therewith. Thus, nozzles within the scope of the present disclosure provide for the same level of air transportation at a reduced level of power consumption. In the context of cotton harvesting, an air conveying system having a nozzle within the scope of the present disclosure is operable to convey a particular rate of harvested cotton at a reduced level of power consumption compared to existing cotton harvesters.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A nozzle for an agricultural machine comprising:
a U-shaped body;
an inlet formed at a first end of the U-shaped body, the inlet defining a first datum plane having a first orthogonal coordinate system, the first orthogonal coordinate system comprising:
a first orthogonal axis,
a second orthogonal axis, and
a third orthogonal axis;
a first outlet formed at a second end of the U-shaped body opposite the first end, the first outlet having a height and a width that is perpendicular to the height, the first outlet defining a second datum plane; and
a second outlet formed in the U-shaped body and disposed between the inlet and the first outlet, the second outlet defining a third datum plane, the third datum plane being angularly offset from the first datum plane by a first angular amount within a range of 17.1° to 37.1° about a first line parallel to the first orthogonal axis of the first orthogonal coordinate system and by a second angular amount within a range of −6.9° to 13.1° about a second line parallel to the second orthogonal axis of the first orthogonal coordinate system.

2. The nozzle of claim 1, wherein a centerline of the second outlet extends perpendicularly to the third datum plane and wherein a centerline of the inlet extends perpendicularly to the first datum plane.

3. The nozzle of claim 1, wherein the U-shaped body comprises:
a first portion that includes the inlet;
a second portion that includes the first outlet; and
a transition portion extending between the first portion and the second portion.

4. The nozzle of claim 3, wherein the first outlet is divided by a partition.

5. The nozzle of claim 4, wherein the partition extends along the second portion to the transition portion.

6. The nozzle of claim 4, wherein the partition extends into at least partially into the transition portion.

7. The nozzle of claim 1, wherein the first outlet is divided by a partition and wherein the partition defines an opening extending through the U shaped body.

8. The nozzle of claim 1, wherein the first outlet comprises an opening having an elongated shape.

9. The nozzle of claim 1, wherein the inlet comprises and opening having a circular shape.

10. The nozzle of claim 1, wherein the second datum plane is angularly offset from the first datum plane by approximately 30° about a line parallel to the first axis of the first orthogonal coordinate system.

11. The nozzle of claim 1, wherein the transition portion transitions from an elongated cross-sectional shape to a circular cross-sectional shape.

12. The nozzle of claim 1, wherein the first angular amount is approximately 27.9°.

13. The nozzle of claim 1, wherein the second angular amount is approximately 9.1°.

14. The nozzle of claim 1, wherein the third datum plane is angularly offset from the first datum plane by a third angular amount within a range of −4.1° to 15.9° about a third line parallel to the third orthogonal axis of the first orthogonal coordinate system.

15. The nozzle of claim 14, wherein the third angular amount is approximately 15.8°.

16. The nozzle of claim 1, wherein the first datum plane and the second datum plane are nonparallel.

17. The nozzle of claim 16, wherein the first orthogonal axis is parallel with a line lying on the second datum plane that defines the width of the first outlet.

18. A nozzle for an agricultural machine comprising:
a U-shaped body;
an inlet formed at a first end of the U-shaped body, the inlet defining a first datum plane having a orthogonal coordinate system, the orthogonal coordinate system comprising:
a first orthogonal axis,
a second orthogonal axis, and
a third orthogonal axis;
a first outlet formed at a second end of the U-shaped body opposite the first end, the first outlet divided by a partition and having a height and a width that is perpendicular to the height, the first outlet defining a second datum plane, the first datum plane and the second datum plane being nonparallel; and
a second outlet formed in the U-shaped body and disposed between the inlet and the first outlet, the second outlet defining a third datum plane, the third datum plane being angularly offset from the first datum plane by a first angular amount within a range of 17.1° to 37.1° about a first line parallel to the first orthogonal axis of the orthogonal coordinate system and by a second angular amount within a range of −6.9° to 13.1° about a second line parallel to the second orthogonal axis of the orthogonal coordinate system.

19. A nozzle for an agricultural machine comprising:
a U-shaped body;
an inlet formed at a first end of the U-shaped body, the inlet includes an opening having a circular shape, the inlet defining a first datum plane having a orthogonal coordinate system, the orthogonal coordinate system comprising:
a first orthogonal axis,
a second orthogonal axis, and
a third orthogonal axis;
a first outlet formed at a second end of the U-shaped body opposite the first end, the first outlet having a height and a width that is perpendicular to the height, the first outlet defining a second datum plane, and the first outlet includes an opening having an elongated shape; and
a second outlet formed in the U-shaped body and disposed between the inlet and the first outlet, the second outlet defining a third datum plane, the third datum plane being angularly offset from the first datum plane by a first angular amount within a range of 17.1° to 37.1° about a first line parallel to the first orthogonal axis of the orthogonal coordinate system and by a second angular amount within a range of −6.9° to 13.1° about a second line parallel to the second orthogonal axis of the orthogonal coordinate system.

20. The nozzle of claim 19, wherein the first datum plane and the second datum plane are nonparallel.

\* \* \* \* \*